United States Patent
Bar-Nun et al.

[15] 3,652,434
[45] Mar. 28, 1972

[54] PRESSURE WAVE SYNTHESIS OF AMINOCARBOXYLIC ACIDS

[72] Inventors: Akiva Bar-Nun, Palo Alto, Calif.; Simon H. Bauer; Carl Sagan, both of Ithaca, N.Y.

[73] Assignee: Cornell Research Foundations, Inc., Ithaca, N.Y.

[22] Filed: Oct. 2, 1970

[21] Appl. No.: 77,619

[52] U.S. Cl. ...................204/158 S, 260/518, 204/162 S, 204/165, 204/168
[51] Int. Cl. ...............B01j 1/12, C07c 99/00, C07c 101/50
[58] Field of Search..................204/158, 158 S, 162 S, 165, 204/168, 169; 260/518 R, 534 R, 534 C, 534 G, 534 L

[56] References Cited

UNITED STATES PATENTS 3,578,576  5/1971  Kliss et al..............................204/168

OTHER PUBLICATIONS

Miller, S. L. Science, Vol. 117 (May 15, 1953) pp. 528– 529

Primary Examiner—Howard S. Williams
Attorney—Jones and Lockwood and Ralph R. Barnard

[57] ABSTRACT

A homogenous vapor phase method for preparing aminocarboxylic acids by subjecting a gaseous mixture of compounds containing the elements hydrogen, oxygen, carbon and nitrogen (with the latter two in reduced compounds), which are optionally mixed in an inert carrier gas to pressure wave heating and rapid expansion wave cooling. The products from the heating and cooling process are immediately withdrawn from the reaction chamber into a dilute aqueous solution of a mineral acid wherein the aminocarboxylic acids produced from the process are recovered.

10 Claims, 6 Drawing Figures

INVENTORS
**AKIVA BAR-NUN
SIMON H. BAUER
CARL SAGAN**

BY *Jones and Lockwood*
ATTORNEYS

PRESSURE WAVE SYNTHESIS OF AMINOCARBOXYLIC ACIDS

This invention relates to a homogenous vapor phase method for the synthesis of aminocarboxylic acids by pressure wave heating and rapid expansion wave cooling of a gaseous mixture of compounds containing the elements hydrogen, oxygen, carbon and nitrogen (with the latter two in reduced compounds), which optionally are mixed subject an inert gas. The resulting products are immediately withdrawn from the reaction chamber into a dilute aqueous mineral acid for final recovery of the desired acids.

Recently there have been increased demands for aminocarboxylic acids, both for supplementing protein deficient foods and for utilization of many of these acids and their derivatives in the pharmaceutical and detergents industries. A suitable method for preparing these acids from low-cost and readily available sources has therefore been the subject of many investigations.

The methods generally utilized for preparing aminocarboxylic acids have employed expensive starting materials, such as, for example, halogen substituted carboxylic acids, nitriles, and the like. These prior art methods further require complex reactions which are both time consuming and produce many side reactions requiring meticulous separation and purification steps. Such procedures are quite costly, which causes the price of the acids to be prohibitively high for many uses. For example, the cost of most of the essential aminocarboxylic acids, by virtue of this expensive preparation, effectively prohibits their use as food supplements and the like.

One method for the preparation of aminocarboxylic acids utilizing either ultraviolet light or electrical discharges on a mixture of methane, ethane, water and ammonia has been reported. However, only low yields are thus obtained and the direct product of this method is the production of nitriles which subsequently must be hydrolyzed to the desired acids. Therefore, the problem of conducting a plurality of steps to obtain the desired final products are still encountered in this method.

It is therefore a primary object of the present invention to provide a new and improved process for preparing aminocarboxylic acids from readily available and inexpensive starting materials.

It is another object of the present invention to provide a new and improved process for preparing aminocarboxylic acids directly from a gaseous mixture of compounds containing the elements carbon, hydrogen, oxygen and nitrogen, wherein said gaseous mixture is preferably comprised of water, hydrocarbons and their derivatives and a source of reduced nitrogen in an inert carrier gas.

It is an additional object to provide a new and improved method for preparing aminocarboxylic acids by pressure wave heating and rapid expansion wave cooling of relatively low-cost starting materials.

It is still another object of the present invention to provide a new and improved process for recovering aminocarboxylic acids which have been prepared from a pressure wave heating and rapid expansion wave cooling process.

Briefly, these and other objects of this invention are accomplished by subjecting a gaseous mixture of compounds which collectively contain the elements hydrogen, oxygen, carbon, and nitrogen (with the latter two in reduced compounds) to pressure wave heating and thereafter to a rapid expansion wave cooling, and subsequently recovering the aminocarboxylic acids formed by said heating and cooling by withdrawing the product gas into a dilute aqueous mineral acid solution.

Other objects of the present invention will be apparent to those skilled in the art upon study of the accompanying specification and drawings in which.

It has been found that it is possible to convert a gaseous mixture of compounds which collectively contain the elements carbon, hydrogen, oxygen and nitrogen, preferably the compounds, water, simple hydrocarbons and ammonia into aminocarboxylic acids by heating the reagents quickly to temperatures above 1,800° K., the heating to be followed after a short interval by expansion wave cooling, the cooling rate being at a controlled rate as further described hereinafter. The products are thereafter rapidly withdrawn from the reaction chamber into a dilute aqueous mineral acid.

One convenient method for conducting the required heating and cooling of the process gas or process mixture of this invention is to employ a shock tube. A shock tube is a tube in which a gas or a gas mixture can be heated very rapidly to very high temperatures by a pressure wave, developed by the sudden expansion of the driving gas from a high to a lower pressure. The driven gas is thus subjected to an adiabatic compression. The shock wave heating is followed after a short interval by rapid cooling through expansion. Specifically, as described herein below, the process gas is placed in one section of the shock tube (the driven section) which is separated from the driver section by a thin diaphragm. Bursting of the diaphragm which separates the driver from the driven sections by increased driver gas pressure generates an "incident" shock wave which propagates through the driven section of the tube. This shock produces initial heating of the reactant gas. When the shock arrives at the closed (terminal) end of the tube, the shock wave is reflected and thereby augmented in pressure, and returns toward the driver section of the tube, further heating the gas sample. The reflected shock wave then encounters the cold driver-driven interface which propagates toward the terminal plate of the tube at a speed less than the incident shock wave. Provided certain conditions are fulfilled, the cold interface which follows the shock (compression) wave generates an expansion wave which propagates toward the hot gas to the terminal plate, thereby cooling the hot reactant gas mixture. Also, the cooling process can be augmented by the expansion wave, resulting from the bursting of the diaphragm, which propagates toward the driver section, and eventually reflects toward the terminal plate of the driven section. Upon arriving in the reflected shock region, this wave augments the cooling process. In order to achieve the best cooling rate, the tube can be "tuned" so that the reflected shock wave meets the gas interface and the reflected expansion wave coming from the driver section at approximately the same point. Reheating of the gas by subsequent reflections in a shock tube can be prevented by the utilization of a damping (ballast) tank attached to the shock tube at approximately the location of the diaphragm separating the driven section from the driver section of the shock tube.

Figure 1:
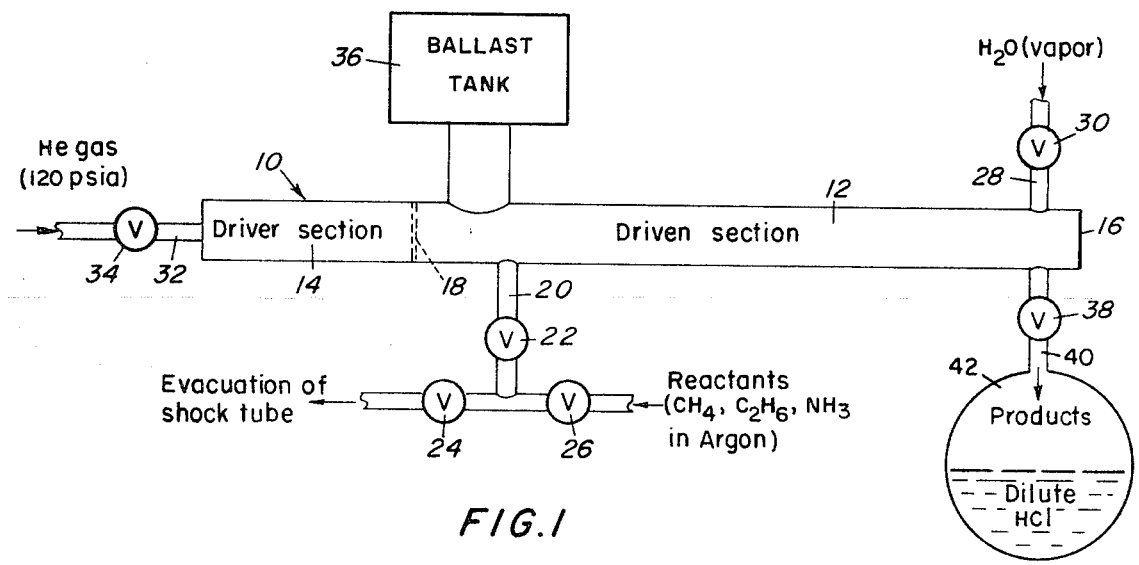
FIG. 1 is a simplified diagram of a shock tube utilized in the preferred embodiment of the present invention.

Referring now to FIG. 1, there is shown a shock tube device adaptable to the practice of the present invention. The tube 10 consists of a driven section 12 and a driver section 14. The shock tube should be evacuated to eliminate contaminating materials prior to conducting the reaction. This is accomplished by opening valves 22 and 24 to a pump. Once the tube has been evacuated, valve 24 is closed. Water vapor is introduced into the driven section 12 under moderate pressure through line 28, which is controlled by valve 30, this valve being closed when the desired volume of water vapor has been introduced into the driven section. The reactant gases consisting of methane, ethane, and ammonia in an inert diluent (argon) are then introduced into the driven section via line 20 under moderate pressure by opening valve 26. Once the desired pressure of the reactant gases is attained in the driven section, valves 22 and 26 are closed. When the desired reactants (including water) have been introduced into the driven section and all of the valves have been closed, the driving gas, helium, is introduced into driver section 14 under pressure via line 32 by opening valve 34. When the pressure of the driver gas in the driver section reaches about 120 p.s.i.a., the 3 mil thick Mylar membrane 18 suddenly ruptures, causing pressure wave heating in the driven section of the shock tube. The pressure wave progresses through the driven section 12 at supersonic speeds to terminal plate 16, from which the wave is reflected back to cause a further compression shock. The reflected shock wave thereafter meets the diffused interface sample section between the driven and driver gases across which a high thermal gradient persists. The hot reacting gases produced by the shock wave are quenched by the cooler, trailing driver gas. The ballast tank 36 serves to greatly minimize succeeding reflections of pressure and expansion waves from the tube terminal plate, which waves would cause unwanted heating of the products synthesized. Immediately after the shock wave is produced as described above, valve 38 is opened so that the products can be withdrawn from the driven section (reaction chamber) via line 40 into the dilute aqueous mineral acid (hydrochloric acid) contained in the collecting vessel 42. This container has been previously evacuated of air. The small pressure still remaining in the shock tube after the pressure wave heating facilitates rapid injection of the product gas into the mineral acid solution as soon as valve 38 is opened.

Figure 2:
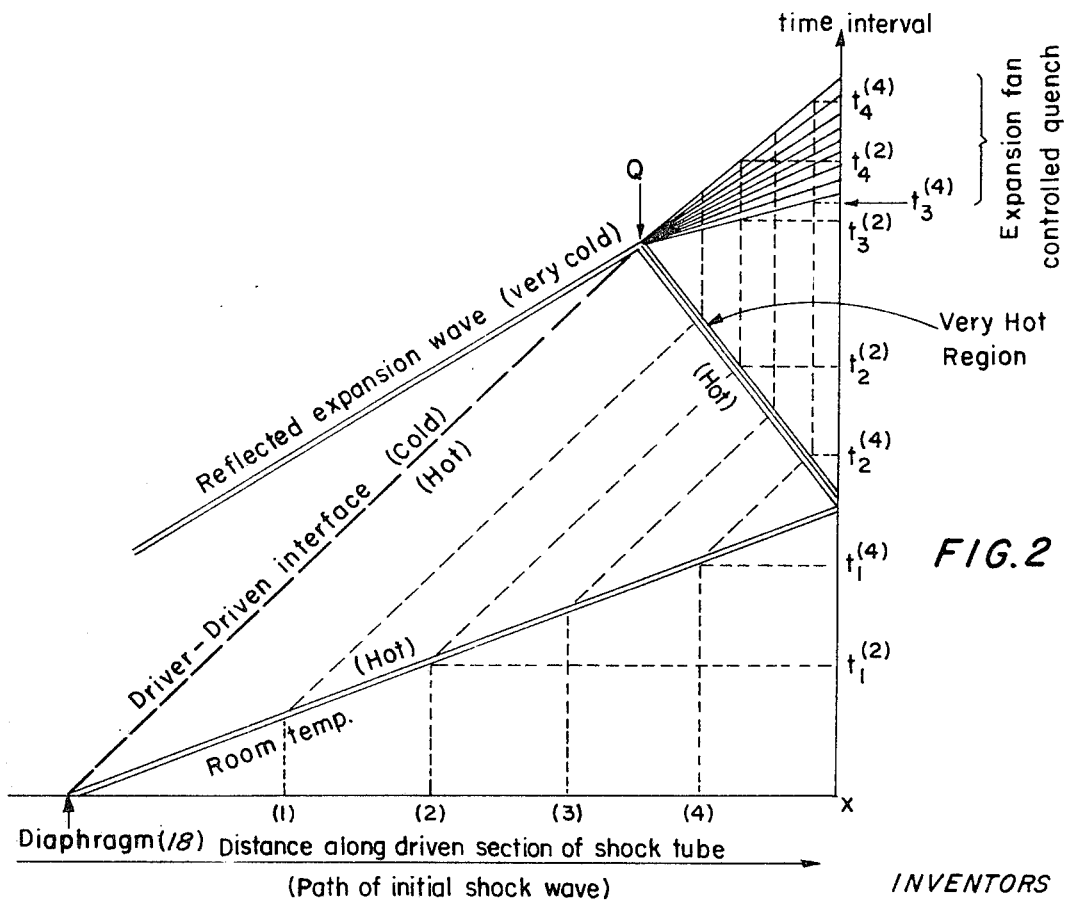
FIG. 2 is a simplified diagram showing the path of the initial shock wave, the path of the driver-driven interface, the reflected expansion wave and the reflected shock wave at different time intervals as each of the waves progress through the shock tube shown in FIG. 1.

In FIG. 2 a simple graph is shown which illustrates the relationship of the pressure wave, the driver-driven interface, the reflected expansion wave and the reflected shock wave as they progress along the length of the driven section of the shock tube at various time intervals. During the initial heating, the reactant gas mixture is very rapidly heated by the pressure wave progressing through the driven section of the shock tube at intervals, or tube locations, (1), (2), (3), (4) and beyond, shown in the diagram. The lower double line illustrates the pressure wave, the frontal portion of which is at room temperature, with a hot portion immediately following the frontal portion of the wave as it progresses to the terminal plate at point X. The triple line illustrates the shock wave reflected at X as a wave of greater strength, which causes an additional compression thereby creating a very hot region for the reactant gas, as shown in the diagram. The cold driver-driven interface, which represents the cooling of the driver gas by expansion follows the shock wave, is illustrated by the hyphenated line. By adjusting the length of the driver section (tuning), the reflected expansion wave is caused to meet the diffused interface section between the hot and the cold gases simultaneously with the reflected shock wave at point Q, and the hot gas mixture is rapidly cooled (quenched) by the expansion wave generated at point Q.

Figure 3:
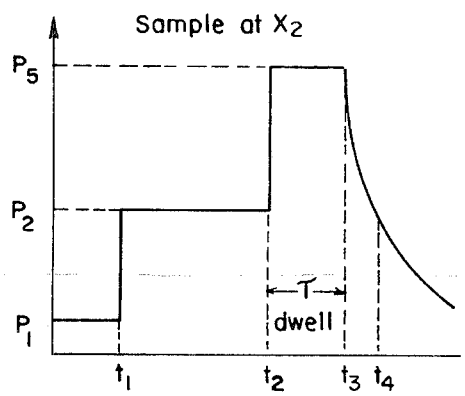
FIG. 3 is a simplified graph showing the relationship of the pressure and time encountered at an intermediate point in the driven section of the shock tube.
Figure 4:
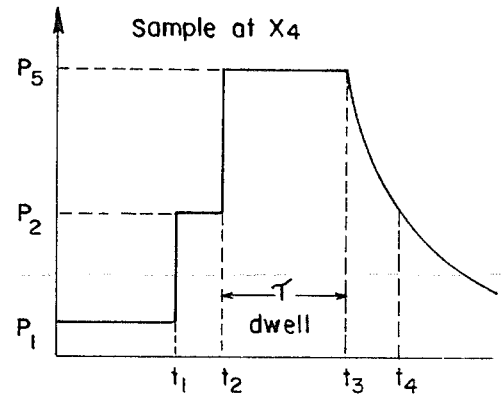
FIG. 4 is another simplified graph showing the relationship of the pressure and time encountered at a latter point in the shock tube.

FIG. 3 is a graph showing the changes in pressure of the gas initially located in the shock tube at point $x_2$ of FIG. 2 during the course of the above sequence of compressions and expansions. As can be seen from this graph, the pressure is raised from $p_1$ to $p_2$ by the initial shock wave passing point $x_2$ at time $t_1^{(2)}$, the length of time required for the shock wave to travel from the diaphragm. The reflected shock wave again raises the pressure to $p_5$ at time $t_2^{(2)}$, and the gas remains at this pressure for a short dwell period. Thereafter, the gas rapidly cools by expansion, as shown by the slope between $t_3^{(2)}$ and $t_4^{(2)}$. FIG. 4 is a similar representation illustrating the relationship between pressure and time of the gas initially at point $x_4$ in the shock tube. Since this gas sample is closer to the terminal end of the tube, the interval between successive increases in pressure, i.e., the time interval between $t_1^{(4)}$ and $t_2^{(4)}$, is shorter than is the case for point $x_2$.

Figure 5:
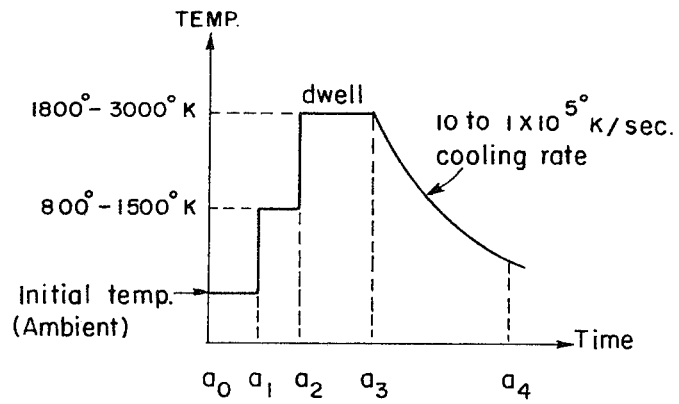
FIG. 5 is a simplified graph describing the temperature versus time generally encountered during the pressure wave heating of the present invention.

FIG. 5 illustrates the sequence of temperatures and of their duration to which a typical gas sample is subjected in the practice of the invention, the illustrated relationship being a general one, and not representative of a measurement at any specific point in the shock tube. The first flat line indicates the temperature of the gas prior to the pressure wave heating. Generally, room temperature is used as a starting temperature, but the temperature may be increased by a heating coil or other means to temperatures up to about 150° C. As shown in the graph, by the first vertical line, the temperature of the gas is raised at time $a_1$ to a high temperature at an extremely rapid rate by the first pressure increase caused by the incident shock wave, the reflected wave thereafter subjecting the gas to an additional heating at time $a_2$, as illustrated by the second vertical line. The gas remains at the higher temperature for a short dwell period of about one-half to about 5 milliseconds and thereafter, at time $a_3$, it is rapidly cooled at a rate of about 10 to about $1 \times 10^{5°}$ K. per second ($10^{5°}$ to about 6° K./sec.) by the expansion wave described above.

Figure 6:
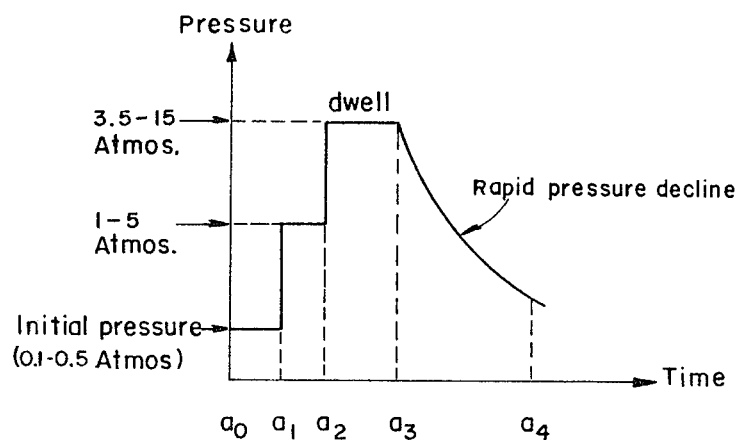
FIG. 6 is a simplified graph describing the pressure versus time encountered in the practice of the invention.

FIG. 6 is a similar representation as shown in FIG. 5, illustrating pressure versus time generally encountered during the practice of the invention.

The dwell periods indicated in the graphs for the reaction during which the mixture is subjected to the reflected shock temperature is determined by the shock speed and the dimensions of the shock tube. The incident and reflected equilibrium shock temperatures are calculated from the conservation equations, the thermodynamic functions of the reactants and products in the mixture, and the measured shock speed. The rapid cooling or quenching, as indicated by the curved line in the graphs, is controlled in a shock tube device by the specific heat of the initial mixture, the dimensions of the shock tube and the shock speed. For optimum operation, the expansion wave reflected from the driver end of the tube should arrive simultaneously with reflected shock wave at the interface between the driver gas and the driven gas. Preferably, the cooling rate will be from about 10 to about $1 \times 10^{5°}$ K. per second (i.e., $10^{5°}$ to about 6° K./sec.) to obtain the best results.

A more detailed description of the type of shock tube shown in FIG. 1 (except for the recovery vessel) and a further explanation of pressure wave heating, as generally described above, is disclosed in *J. Chem. Phys.* 38, 2056 (1963) and *Science*, 141, 867 (1963), the disclosures of which are incorporated herein by reference.

Various shock tube devices may be used in the practice of this invention to obtain the required pressure wave heating with subsequent expansion wave cooling, provided that a recovery vessel containing the necessary dilute aqueous mineral acid can be attached to the device to collect the amino acids prepared from the heating and cooling process. Among the shock tubes described in the prior art which may be employed for the purpose of the invention are those described in U.S. Pat. Nos. 2,832,665 and 2,832,666.

Pressure wave heating with rapid cooling by an expansion wave, and using the reactants of the present invention, may be accomplished by a number of devices and techniques other than the above-described shock tubes, but which generate the required temperature-pressure cycles in gases. These other devices include heating by means of a ballistic piston and by "-gear" compression followed by divergent nozzle expansion or through a turbine fan (turbo-expander) and the like. Among the known devices which have been described in the art which may be used in the practice of this invention are those described in U.S. Pat. Nos. 2,902,337, 3,231,482 and 3,272,598.

The reaction gas mixture employed in the present invention may be varied greatly, depending on the aminocarboxylic acids desired to be obtained from the process. The relative proportion of the mixtures of aminocarboxylic acids desired can also be controlled so long as the compounds in the reaction mixture collectively contain the elements hydrogen, oxygen, carbon, and nitrogen (H, O, C and N), and with the exception of $H_2O$ the compounds are present in their reduced states. The reaction mixture may contain compounds having other elements, such as, sulfur, as long as hydrogen, oxygen, carbon and nitrogen are present.

The only other limitation on the reactants employed in the process of the invention is that they should be capable of existing in the gaseous phase without decomposition prior to being subjected to pressure wave heating. In other words, the reactants must be stable and gaseous at a temperature and pressure suitable for injection in the processing device prior to being subjected to the pressure wave heating sequence.

Those compounds possessing the foregoing characteristics are, of course, water, ammonia, various hydrocarbons and their derivatives. The more readily available and inexpensive $C_{1-4}$ carbon containing hydrocarbons and their derivatives are preferred when used together with water and ammonia.

In the foregoing instance, the hydrocarbons and their derivatives having a molecular weight of about 100 generally possess the proper vapor pressure characteristics so that they can be utilized in the process of the present invention.

Among the hydrocarbon compounds which may be employed are included the lower aliphatic hydrocarbons, such as, methane, ethane, propane, butane, pentane, hexane, heptane and isomers thereof. The olefinic hydrocarbons may also be employed, such as, ethylene, propylene, butene, butadiene, pentene, allene, hexene, heptene and their isomers. Also, the cycloaliphatic hydrocarbons, including cyclopropane, cyclobutane, cyclopentane, cyclohexane, and their olefinic derivatives may be employed. Aromatic hydrocarbons including benzene and toluene also may be employed.

Various substituted hydrocarbon derivatives may also be utilized as reactant gases in the process of the present invention. For example, the amine substituted hydrocarbons, such as methyl amine, ethyl amine, propyl amine and the like. Other derivatives which may be employed include the sulfur and oxygen substituted hydrocarbons, such as, the $C_{1-4}$ carbon containing mercaptans, alcohols and aldehydes.

As previously indicated, the more readily available and lower cost starting materials are preferred. A particularly preferred group of hydrocarbons include methane, ethane, propane, propylene and mixtures thereof, which are used in combination with ammonia and water to produce glycine, alanine, leucine, isoleucine and valine. However, if it is desired to produce some of the more complex aminocarboxylic acids, other raw materials should be utilized, such as toluene for the production of phenylalanine, and propylamine for the production of lysine, etc.

One source of raw materials which may be utilized in the practice of this invention is the gases vented and burned at many oil wells and in refinery operations. Utilization of these gases may be best accomplished by the integration of the rejected gases with a plant which produces ammonia and/or amines. Furthermore, the aminocarboxylic acids generated in these processes would have to be stripped from the carrier gases and further treated for conversion to more complex materials, either by another exposure to shock heating or by some catalytic process. The utilization of these gases as the source of raw materials is of particular importance in the practice of this invention since a dual purpose may be accomplished, i.e., production of aminocarboxylic acids from low cost and discarded materials and reduction of the air pollution resulting from the vented and burned gases at many oil wells and refinery operations.

The reaction gas mixture for the production of aminocarboxylic acids should have different compositions, according to the relative proportions of acids one wishes to obtain from the process. The following elemental molar ratios will generally provide the desired results for the preparation of the simpler aminocarboxylic acids:

$H : C : N : O = 77 : 11 : 7.5 : 19$ and when additional argon or molecular nitrogen ($Ar, N_2$) is used as a diluent:

$H : C : N : O : Ar(N_2) = 52 : 7.5 : 5 : 12.5 : 23$

It is possible to vary the relative molar concentration of each element up to a factor of 2 and hydrogen up to a factor of 4. The argon or nitrogen molar concentrations can be varied from 0 to 80 percent. For the production of sulphur containing aminocarboxylic acids, the following elemental composition should be used:

$H : C : N : O : S = 72.5 : 11 : 7.5 : 19 : 5$ and when argon or nitrogen is used as a diluent:

$H : C : N : O : S : Ar(N_2) = 50 : 7.5 : 5 : 12.5 : 3.3 : 20$

In this case also it is possible to vary the relative molar concentrations by the factors mentioned above.

The production of the above-described and other aminocarboxylic acids can be generally achieved by pressure wave heating a reaction mixture containing compounds which include the elements carbon, hydrogen, oxygen, nitrogen, or sulfur, including part of them, all together in one gas mixture or by introducing some of the gases into one part of the reaction vessel and some into another part, allowing or not allowing complete mixing of the different gas mixture before pressure wave heating under net reducing conditions. However, it is essential that there be present in the mixture the elements carbon, hydrogen, oxygen and nitrogen (C, H, O and N) for the successful production of aminocarboxylic acids following the practice of the present invention.

It is possible to employ a wide variety of molar concentrations of the reactants utilized in the process of the present invention. As alluded to above, variation of the molar ratios can be utilized to control the relative concentrations of the resulting aminocarboxylic acid obtained. Obviously, an extremely high proportion of any one of the reactants will not provide favorable results. Preferably, the reaction mixture will contain from about 3 to about 10 percent by weight water, from about 5 to about 20 percent hydrocarbon or derivative thereof, about 10 to about 30 percent by weight of ammonia, providing ammonia is utilized as the sole nitrogen source. In this connection, it will be realized that there must always be present in the reaction mixture a source of reduced carbon and reduced nitrogen, since the process in essence is conducted in a reducing atmosphere. The nitrogen source may be derived from ammonia as the sole source of nitrogen, or ammonia may be used in combination with amino-substituted hydrocarbons, such as propylamine or aniline. Therefore, a wide variety of mixtures of reactants can be used, depending, of course, on the products or the ratio thereof one wishes to obtain from the process of this invention.

As previously indicated, the process of the present invention may be conducted with or without an inert carrier gas. However, for optimum results, an inert carrier gas should be employed to aid in minimizing and controlling the degradative reactions during the early part of the quench period of the products generated. The amounts of carrier gas utilized for this purpose are not critical. Thus, as alluded to hereinabove, it is possible to exclude the carrier gas by substituting therefor, some of the gaseous materials used as reactants for this purpose. Broadly speaking from 0 to 80 percent by weight of the inert carrier gas based on the total gaseous composition employed may be utilized. Preferably, the mixture will contain from about 50 to about 80 percent by weight of the total composition.

Among the inert gases found useful, as diluents or carriers, are included: argon, neon, and molecular nitrogen or any other simple gas of molecular weight of 20 or greater which is both gaseous at prereaction conditions and inert to the reactants and aminocarboxylic acids. Mixtures of these gases may also be utilized.

The recovery solution can be any dilute mineral acid in which the aminocarboxylic acids will readily dissolve therein and will not adversely affect the aminocarboxylic acids recovered. Among the mineral acids which may be employed to recover the aminocarboxylic acids include hydrochloric acid, sulfuric acid, phosphoric acid, p-toluene sulfonic acid, hydrochloric acid being preferred, and those organic acids in which the amino acids are readily soluble.

The mineral acid is preferably dilute, but the concentration may be adjusted as desired, depending on the solubility and stability of the aminocarboxylic acids one wants to recover. Preferably, the concentration of the acid is from about 0.1 to about 1 N.

The aminocarboxylic acids should be recovered in the dilute acid solution as soon as practical after the rapid heating and cooling. Generally the product mixture should be vented into the acid solution within about 1 minute after the reaction, in order to obtain the highest yield.

The process of this invention which converts simple starting materials to aminocarboxylic acids by pressure wave heating and rapid expansion wave cooling or quenching the heated gases and the withdrawing of said acids into a dilute mineral acid can be conducted in either a batch, semi-batch, or continuous process. For the purpose of illustration, only the batch process is described, but those skilled in the art will realize that sufficient rapid gas heating and cooling can be achieved by known multi-compression devices without departing from the scope of the invention.

Utilizing the batch process described above, it is possible to operate the process of the invention under a wide variety of conditions, as alluded to above. Preferably, the mixture of gases used as reactants are mixed with an inert gas at a total pressure of about 0.1 to about 0.5 atmospheres and at ambient temperatures. These conditions may be adjusted, however, depending on the reactants and the device employed. Thus, if a high molecular weight reactant is employed, the temperature should be such that it will be in the form of a gas when introduced into the reactor. After the reactants are introduced into the reaction chamber or the driven section of a shock tube, they are subjected to pressure wave heating and subsequent expansion wave cooling. The pressure wave heating temperature can be varied in accordance with known techniques. Preferably, the reaction mixture is pressure wave heated to an initial temperature of about 800° to about 1,500° K. and at a pressure from about 1 to about 5 atmospheres. Subsequent shock heating, such as that caused by wave reflection, will cause a rise in the temperature to between about 1,800° to about 3,000° K. and a corresponding pressure of about 3.5 to about 15 atmospheres. Once the super-hot temperature and high pressure are obtained, the mixture is maintained at this temperature and pressure for a "dwell" time of about 0.5 to about 5.0 milliseconds before it is rapidly cooled or quenched by the expansion wave. The dwell time, of course, is relative to the temperature obtained. For example, the higher the temperature obtained (produced by a faster moving shock wave) during the pressure wave heating, the shorter the dwell time. Likewise, a lower pressure wave heating will result in a longer dwell time.

The rapid cooling or quenching of the super-heated gas mixture in a shock tube device is achieved by gas dynamic expansion at a rate of about 10 to $1 \times 10^{5}$° K. per second. This expansion is a consequence of the gas dynamic interaction of the reflected shock wave with the interface and the reflected expansion wave. The rapid quench may also be achieved by controlled expansion through a divergent nozzle or a turbine wheel expander, and the like. Once the gases are dynamically expanded and rapidly cooled, the aminocarboxylic acids formed by the process are immediately recovered by venting the product mixture into a dilute aqueous mineral acid, such as hydrochloric acid. This method of recovery of the aminocarboxylic acids in the process of this invention has been found to be surprisingly successful and therefore constitutes an essential part of the invention.

Problems associated with impurities encountered in recovering the desired aminocarboxylic acids can be minimized by contacting the product mixture with mineral acid solutions for which the pH is appropriately adjusted, the reason, of course, being that the zwitterion properties of the aminocarboxylic acids, which govern the solubility of the respective aminocarboxylic acids in water are a function of pH. Therefore, by adjusting the pH of the solution, the desired aminocarboxylic acids can be conveniently recovered from the product gas absorbed by the recovery solution.

Suitable driver gases are preferably, though not necessarily, ones which will not react with the gases being processed, or the resulting products, ones which can be readily heated and/or compressed to the desired temperatures and pressures without decomposition or condensation and ones which have relatively low molecular weights. Examples of typical gases suitable under most circumstances are hydrogen, monoatomic gases such as helium or mixtures of helium with other inert gases which as argon and nitrogen. Under many circumstances, superheated steam is suitable. Under some circumstances, the driver gas and process gas can be the same chemically, but differ from each other in temperature and/or pressure, etc.

The following is presented as an illustrative example of a set of specific conditions for effecting the type of result discussed in the foregoing specification:

EXAMPLE

The process was conducted in a pressurized driver single-pulse shock tube as shown in simplified form in FIG. 1. The driven section of the shock tube consisted of a 1 inch I.D. "-double tough" pyrex tubing approximately 60 inches long and a brass driver section approximately 18 inches long. The driver section and driven section of the shock tube were separated by a 3 mil Mylar diaphragm. An 8 liter damp (ballast) tank was installed adjacent to the diaphragm holder on the driven side. Pressures were sensed with piezoelectric gauges and recorded with a dual beam oscilloscope operating at a total scan time of 100 $\mu$sec. and 5 msec., respectively, from which the shock speed was calculated, and the dwell time measured.

The reaction mixture was prepared in a large glass bulb and consisted of 3.3 percent $CH_4$, 11 percent $C_2H_6$ and 5.6 percent $NH_3$ (Matheson "pure" grade, was used without further purification). The foregoing reaction mixture was diluted with Matheson ultra-pure argon. A second glass bulb was partly filled with distilled water which had been degassed several times under vacuum, with the water alternately frozen and heated. This glass bulb was attached to the terminal end of the driven section of the shock tube.

In order to insure that there would be no contamination of the materials obtained from the processes, the shock tube, prior to conducting the reaction, was cleaned 25 times with toluene and ethanol, and thereafter wiped dry with a paper towel. After each cleansing, the paper towel was checked with a ninhydrin spray for amino acids. All these tests for amino acids were negative. With a heating tape, the driven section temperature was raised to approximately 80° C., and pumped to below $10^{-4}$ torr for 5 hours. Water vapor was introduced at a pressure of 5–25 torr from the water reservoir bulb attached to the terminal end of the shock tube. The reaction mixture was immediately thereafter introduced into the shock tube via the pump port. Sample pressures in a range of 10 to 90 torr were utilized. About 2 minutes were allowed for partial mixing of the reactants. The helium driver gas was then introduced slowly into the driver section by opening the valve from the helium source. The helium gas continued to build up pressure in the driver section (to about 120 p.s.i.) until it caused the diaphragm to rupture, and this sudden release of the high pressure driver gas sent a shock wave down the driven section of the shock tube. As successive sections of the reactant gases were traversed by the incident shock front, the temperature of the gases rose sharply, i.e., in $10^{-6}$ seconds to 900°–1,500° K. Of course, the temperature and rate of heating is determined by the shock speed. Due to momentum conservation, the shock wave reflected from the terminal plate of the shock tube causes another compression shock, so that the sample gas was further heated to a temperature in the range of 1,800°–3,000° K. The second compression shock additionally compressed the gases to a net density of approximately six times the original. When the reflected shock wave met the diffused transition layer of gas between the driven and the driver gases an expansion wave was generated, which propagated into the twice shocked gas sample. Rapid cooling or quenching was augmented when the length of the driver section was adjusted so that the expansion wave reflected from the driver section end plate of the tube simultaneously arrived at this intersection. Cooling rates in the range of 10 to $1 \times 10^{5\circ}$ K. per second resulted, depending on controlled experimental conditions. The dwell periods for the reaction during which the mixtures are subjected to reflected shock temperature for the aforementioned shock tube range from 500 to 1,000 $\mu$sec., which, of course, were determined by the shock speed.

Immediately after initiating the shock, as described above, the valve between the terminal end of the shock tube and the previously evacuated sample-collecting bulb was opened. For this purpose, a 2 liter glass vessel containing 10 ml. of 0.1 N HCl (degassed) was placed in the gas collecting vessel, from which the air had been exhausted.

After collecting the shocked and quenched product mixture the valve to the sampling bulb was closed and the bulb was detached from the shock tube and vigorously shaken, and the walls were "washed" by slowly rotating the bulb. The bulb containing the aqueous solution and residual quenched gases was then evacuated and reattached to the shock tube so that the next run could be initiated.

A series of three shocked samples were contacted with the same 0.1 N HCl solution for each range of shock speeds and the product samples were thus collected in one bulb. These solutions were analyzed for amino acids by paper chromatography, with n-butanol, methanol, water and ammonia in the ratio of 10 : 10 : 5 : 2, respectively, and by column chromatography in an amino acid analyzer.

Ten shocks were made, covering the range of compositions and shock speeds summarized in the following table. All the dwell times were approximately 500 $\mu$sec. Three control runs (Group D) were made with the reaction mixture used for Groups B and C. For Group D, the sample was introduced into the driven section in the usual manner, and the sample was allowed to remain in the shock tube, which was heated to 380° K., 5 minutes and then slowly pushed into the sample bulb by a stream of helium without rupturing the diaphragm. Group A shocks were run with argon and water vapor only, and thus also constitute control experiments.

TABLE I

Experimental Conditions for Shock Synthesis

| Shock No. | (Estimated) $H_2O$ pressure (torr) | Total initial pressure (torr) | Incident shock speed (mm./$\mu$sec.) | Approximate[a] reflected shock temperature (°K) |
|---|---|---|---|---|
| (A) 1 | 25 | 50 | 1.18 | 2,000 |
| 2 | 22 | 47 | 1.18 | 2,000 |
| 3 | 12 | 32 | 1.33 | 3,000 |
| (B) 4 | 19 | 69 | 1.08 | 1,600 |
| 5 | 10 | 35 | 1.30 | 3,000 |
| 6 | 10 | 35 | 1.30 | 3,000 |
| (C) 7 | 20 | 110 | 0.95 | 1,000 |
| 8 | 7 | 30 | 1.30 | 3,000 |
| 9 | 5 | 20 | 1.42 | 3,500 |
| 10 | 3 | 15 | 1.42 | 3,500 |

[a] Estimated on the basis of no reaction, assuming argon was the driven gas. Actual sample temperatures were several hundreds of degrees lower except for (B) 4 and (C) 7.

Group A: Test gas consisted of argon plus water.

Groups B and C: Test gas was 3.3% $CH_4$, 11% $C_2H_6$, 5.6% $NH_3$ plus $H_2O$ (as indicated); the major constituent was Argon.

No amino acids were detected in Group A demonstrating that the shock tube was clean and also clearly illustrating that the hydrocarbon/ammonia/water mixture is necessary for amino acid production. Group D demonstrates that shock heating is essential for the production of amino acids and slow heating of the mixture does not cause the desired conversion. In other words, the 5 minute exposure of the ingredients at a temperature of 380° K. is not sufficient to cause the conversion. In Groups B and C, aminocarboxylic acids were found in the following concentration ($\mu$-moles per 10 ml. of solution):

B: Glycine, 73; alanine 34.5; valine 0.55; leucine 0.105
C: Glycine, 62.5; alanine 17.6; valine 3.25; leucine 0.27.

Yields calculated for Group B were surprisingly high; 36 percent of the ammonia present was converted to aminocarboxylic acids. These experiments demonstrate that aminocarboxylic acid production was initiated by shock heating and subsequent quenching under strictly homogenous conditions, with all the reactants in the gas phase.

While the present invention is not based upon any particular theory, it is believed that the observed high production efficiency is a consequence of the thermal history of the shocked sample, i.e., the high temperature pulse during which the reagents are partially fragmented must be followed by a rapid quench, during which the radicals react with the remaining reagents in a chain mechanism. The essential reunification steps probably occur with relatively low activation energies during the quench period, thus, bypassing the high temperature thermodynamic barrier which restricts amino acid production under isothermal conditions.

The calculated equilibrium compositions of systems which consist of C/H or C/H/O/N show that at high temperatures the absolute concentrations of complex species are very low. However, the relative concentrations of the four amino acids found in the example are close to the mole fraction ratios of the radicals H, $CH_3$, $(CH_3)_2CH$, and $(CH_3)_2CH-CH_2$ calculated at equilibrium for a C/H system around 2,000° K. The ratios of radicals are: $H/CH_3 = 1.5$, $CH_3/C_3H_7 = 40$, and $CH_3/C_4H_9 = 800$. In experiment B the observed corresponding ratios of the amino acids are: Gly/Ala=2.1, Ala/Val=63, and Ala/Leuc=350. These rough comparisons indicate that while thermodynamic relations do impose restrictions on the relative concentrations of molecular fragments under shock conditions, further reaction and condensations occur during the quench period so that no thermochemical restrictions apply to the production of aminocarboxylic acids under the conditions prescribed by this invention.

As it can be readily observed from the results in the examples and the disclosure, the present invention constitutes a significant advance in the art of producing aminocarboxylic acids. The process of the present invention is able to produce aminocarboxylic acids at high conversion levels, i.e., in the order of 35 percent of the ammonia present.

It will be apparent to those skilled in the art that by practicing the present invention, the relatively expensive aminocarboxylic acids can be synthesized from raw materials which are inexpensive and readily available, providing, of course, the carbon and nitrogen containing reactants are present as reduced compounds.

It will be apparent to those skilled in the art that many variations may be desirable and may readily be produced in the above-described process. Therefore, the scope of the invention is not to be limited by the illustrations hereinabove described, but is to be determined by the appended claims.

What is claimed is:

1. A homogeneous gas phase method for preparing aminocarboxylic acids comprising:
   subjecting a gaseous mixture of compounds which collectively contain the elements hydrogen, oxygen, carbon, and nitrogen provided the latter two elements are present in reduced compounds, to a very rapid heating by a pressure wave and a very rapid cooling by an expansion wave, and
   rapidly venting said heated and cooled mixture of products into a solution of dilute aqueous mineral acid to recover said aminocarboxylic acids.

2. The method as defined in claim 1 wherein said gaseous starting mixture is diluted in an inert gas.

3. The method as defined in claim 2 wherein said gaseous mixture comprises water, a member selected from the group consisting essentially of hydrocarbons, substituted hydrocarbons, ammonia, and mixtures thereof.

4. The method as defined in claim 3 wherein said gaseous mixture is at least partially mixed in an inert gas at a pressure of about 0.1 to about 0.5 atmospheres and at a temperature up to 150° C., and said gaseous mixture is heated by a pressure wave to a temperature of about 1,800° to about 3,000° K. for about one-half to about 5 milliseconds, and said cooling is at the rate of about 10 to about $1 \times 10^{5}$° K. per second.

5. The method as defined in claim 4 wherein said inert gas is selected from the group consisting of argon, neon, molecular nitrogen and mixtures thereof.

6. The method as defined in claim 1 wherein said gaseous mixture comprises water, ammonia and low molecular weight hydrocarbons selected from the group consisting of methane, ethane, propane, propylene and mixtures thereof.

7. The method as defined in claim 1 wherein said mineral acid is hydrochloric acid.

8. The method as defined in claim 6 wherein said gaseous mixture comprises from about 3 to about 10 percent of water, from about 5 to about 20 percent by weight of said low molecular weight hydrocarbons and about 10 to about 30 percent by weight of ammonia diluted in about 50 to about 90 percent by weight of an inert gas.

9. The method as defined in claim 8 wherein said low molecular weight hydrocarbons are selected from the group consisting of methane, ethane and mixtures thereof.

10. The method as defined in claim 1 wherein said rapid heating is conducted in a single pulse shock tube.

* * * * *